(12) United States Patent
Nishino et al.

(10) Patent No.: US 8,013,962 B2
(45) Date of Patent: Sep. 6, 2011

(54) LCD APPARATUS HAVING PARTICULAR COLOR FILTERS CONFIGURATION

(75) Inventors: Toshiharu Nishino, Tokyo (JP); Norihiro Arai, Tokyo (JP); Kunpei Kobayashi, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/731,085

(22) Filed: Mar. 24, 2010

(65) Prior Publication Data

US 2010/0245718 A1  Sep. 30, 2010

(30) Foreign Application Priority Data

Mar. 26, 2009  (JP) ................. 2009-075870

(51) Int. Cl.
*G02F 1/1335* (2006.01)
(52) U.S. Cl. ........... 349/114; 349/106; 349/65; 349/113
(58) Field of Classification Search .......... 349/114, 349/106, 113, 65
See application file for complete search history.

(56) References Cited

U.S. PATENT DOCUMENTS

| | | | |
|---|---|---|---|
| 6,909,479 B2* | 6/2005 | Iijima | ............... 349/109 |
| 7,440,056 B2 | 10/2008 | Kobayashi | |
| 2002/0176036 A1* | 11/2002 | Kaneko | ............... 349/65 |
| 2003/0058390 A1 | 3/2003 | Fujii | |
| 2004/0061812 A1 | 4/2004 | Maeda | |
| 2006/0289880 A1 | 12/2006 | Kurihara | |
| 2006/0290844 A1 | 12/2006 | Epstein et al. | |
| 2007/0147066 A1 | 6/2007 | Boyd et al. | |
| 2009/0027602 A1 | 1/2009 | Kobayashi | |
| 2009/0167981 A1 | 7/2009 | Arai et al. | |
| 2010/0103350 A1 | 4/2010 | Arai et al. | |
| 2010/0123856 A1* | 5/2010 | Arai et al. | ............... 349/62 |
| 2010/0296036 A1 | 11/2010 | Fujii | |

FOREIGN PATENT DOCUMENTS

| | | |
|---|---|---|
| JP | 2001-235606 A | 8/2001 |
| JP | 2003-015133 A | 1/2003 |
| JP | 2003-098325 A | 4/2003 |
| JP | 2003-172931 A | 6/2003 |
| JP | 2003-279988 A | 10/2003 |
| JP | 2004-054034 A | 2/2004 |
| JP | 2004-093715 A | 3/2004 |
| JP | 2004-287323 A | 10/2004 |
| JP | 2004287323 A * | 10/2004 |
| JP | 2008-122834 A | 5/2008 |

OTHER PUBLICATIONS

Applicants bring the attention of the Examiner to the following pending U.S. Appl. No. 12/940,919, filed Nov. 5, 2010.

(Continued)

*Primary Examiner* — Mike Qi
(74) *Attorney, Agent, or Firm* — Chen Yoshimura LLP

(57) ABSTRACT

An LCD apparatus includes an LCD panel having a color filter for a plurality of color components and having a plurality of pixels each associated with one of the color components of the color filter, and a side lighting-type backlight unit disposed under the LCD panel. The backlight unit includes a light guide and a light source disposed at least at one lateral end of the light guide, and further includes a reflecting layer on a side opposite to a side facing the LCD panel to reflect light coming towards the reflecting layer from the light guide. The color filter is configured to compensate a change in color spectrum in the ambient light that has passed through the LCD panel and the light guide and that has been reflected by the reflecting layer back to the light guide and the LCD panel so that the color temperature of white display of the LCD panel by the ambient light remains substantially the same as the color temperature of the original ambient light.

7 Claims, 15 Drawing Sheets

OTHER PUBLICATIONS

Japanese Office Action dated Sep. 14, 2010, in a counterpart Japanese patent application of Application No. 2009-075870 citing Foreign Patent document Nos. 1-3 listed above.

Applicants bring the attention of the Examiner to the following pending U.S. Appl. Nos. 12/606,397, filed Oct. 27, 2009 and 12/616,937 filed on Nov. 12, 2009.

Japanese Office Action in a related counterpart Japanese patent application JP 2008-277135, dated on Oct. 26, 2010, citing Foreign Patent document Nos. 1-3 above.

International Search Report (ISR) issued in PCT/JP2008/058162 (related PCT application) mailed in Sep. 2008 for Examiner consideration, citing U.S. Patent Application Publication Nos. 4-6 listed above.

Written Opinion (PCT/ISA/237) issued in PCT/JP2008/058162 (related PCT application) mailed in Sep. 2008.

Machine translation of JP2004-287323 which has been submitted on Dec. 28, 2010.

Applicants bring the attention of the Examiner to the following pending U.S. Appl. No. 12/148,794, filed Apr. 22, 2008. U.S. Appl. No. 12/148,794 has been published under Publication No. 2009-0167981 as listed above.

\* cited by examiner

LCD APPARATUS HAVING PARTICULAR COLOR FILTERS CONFIGURATION

CROSS-REFERENCE TO RELATED APPLICATIONS

This application is based upon and claims the benefit of priority from prior Japanese Patent Application No. 2009-075870, filed Mar. 26, 2009, the entire contents of which are hereby incorporated by reference.

BACKGROUND OF THE INVENTION

1. Field of the Invention

The present invention relates to liquid crystal display (LCD) apparatus including a side light type back lighting, which allows a display using light emitted from the side light type back lighting and a display using ambient light.

2. Description of the Related Art

In recent years, liquid crystal display (LCD) apparatuses that can combine use of a reflection display and a transmission display, which is displayed by illumination light emitted from a back lighting that is located behind an LCD panel, have been developed. The reflection display is displayed by reflecting ambient light that is entered from the front of the LCD panel and passed through a liquid crystal layer of the LCD panel and by emitting the ambient light form the front of LCD panel through the liquid crystal layer. For example, Japanese Patent Publication No. 2004-093715 enables the transmission display and the reflection display in each pixel by dividing each pixel into two areas, in which the pixel electrode in one area is formed of a transparent material and the pixel electrodes in the other area are formed of a structure including a reflective material.

However, when the pixel is divided into the transmission display area and the reflection display area, available light on the respective display areas reduces to half because utilizable display areas thereon reduce to half. Therefore, because each of the respective display areas becomes dark, there is a problem such that the visual quality of the display degrades.

SUMMARY OF THE INVENTION

The present invention aims to provide an LCD apparatus with high visual quality, which can perform a display using light emitted from a backlight and a display using ambient light without dividing each pixel area into a transmission display area and a reflection display area.

In one aspect, the present invention provides an LCD apparatus including an LCD panel having a color filter for a plurality of color components and having a plurality of pixels each associated with one of the color components of the color filter; and a side lighting-type backlight unit disposed under the LCD panel, the backlight unit including a light guide and a light source disposed at least at one lateral end of the light guide, the light guide directing light emitted generally in a lateral direction from the light source towards the LCD panel thereabove to enable a transmission display of an image data controlled by the LCD panel, the backlight unit further including a reflecting layer on a side opposite to a side facing the LCD panel to reflect light coming towards the reflecting layer from the light guide, the reflecting layer further reflecting ambient light originating from an exterior, passing though the LCD panel and through the light guide, back to the light guide and the LCD panel, thereby enabling a reflection display of the image data controlled by the LCD panel in addition to the transmission display using the light source, wherein the color filter is configured to compensate a change in color spectrum in the ambient light that has passed through the LCD panel and the light guide and that has been reflected by the reflecting layer back to the light guide and the LCD panel so that the color temperature of white display of the LCD panel by the ambient light remains substantially the same as the color temperature of the original ambient light.

In another aspect, the present invention provides an LCD apparatus including an LCD panel having a color filter for a plurality of color components and having a plurality of pixels each associated with one of the color components of the color filter; and a side lighting-type backlight unit disposed under the LCD panel, the backlight unit including a light guide and a light source disposed at least at one lateral end of the light guide, the light guide directing light emitted generally in a lateral direction from the light source towards the LCD panel thereabove to enable a transmission display of an image data controlled by the LCD panel, the backlight unit further including a reflecting layer on a side opposite to a side facing the LCD panel to reflect light coming towards the reflecting layer from the light guide, the reflecting layer further reflecting ambient light originating from an exterior, passing though the LCD panel and through the light guide, back to the light guide and the LCD panel, thereby enabling a reflection display of the image data controlled by the LCD panel in addition to a transmission display using the light source, wherein the color filter is configured to shift the color temperature of white display by light that passes through the color filter twice to a higher color temperature.

In another aspect the present invention provides an LCD apparatus including an LCD panel having blue, green and red color filters and having a plurality of pixels each associated with one of the color filters; and a side lighting-type backlight unit disposed under the LCD panel, the backlight unit including a light guide and a light source disposed at least at one lateral end of the light guide, the light guide directing light emitted generally in a lateral direction from the light source towards the LCD panel thereabove to enable a transmission display of an image data controlled by the LCD panel, the backlight unit further including a reflecting layer on a side opposite to a side facing the LCD panel to reflect light coming towards the reflecting layer from the light guide, the reflecting layer further reflecting ambient light originating from an exterior, passing though the LCD panel and through the light guide, back to the light guide and the LCD panel, thereby enabling a reflection display of the image data controlled by the LCD panel in addition to a transmission display using the light source, wherein the color filters are configured such that the transmittance of a peak wavelength in a visible light range of the green color filter and the transmittance of a peak wavelength in a visible light range of the red color filter are both higher than the transmittance of a peak wavelength in a visible light range of the blue color filter and such that the color temperature of total light that combine light that has passed through all of the color filters twice is higher than the color temperature of the light before passing through the color filters.

In another aspect, the present invention provides an LCD apparatus including a color filter primarily for a blue component, a color filter primarily for a green component and a color filter primarily for a red component; an LCD panel arranging the color filters therein and having a plurality of pixels, each of the pixels being associated with one of the color components of the color filters; and a side lighting-type backlight unit disposed under the LCD panel, the backlight unit including a light guide and a light source disposed at least at one lateral end of the light guide, the light guide directing light emitted generally in a lateral direction from the light source towards the LCD panel thereabove to enable a transmission display of an image data controlled by the LCD panel, the backlight unit further including a reflecting layer on a side opposite to a side facing the LCD panel to reflect light coming towards the reflecting layer from the light guide, the reflecting layer further reflecting ambient light originating from an exterior, passing though the LCD panel and through the light guide, back to the light guide and the LCD panel, thereby enabling a reflection display of the image data controlled by the LCD panel in addition to the transmission display using the light source, wherein the color filters are configured such that a transmission intensity in a blue wavelength range of the color filter for the green component is higher than a transmission intensity in an absorption wavelength range of the color filter for the blue component and is higher than a transmission intensity in an absorption wavelength range of the color filter for the red component, and such that the transmittance of a peak wavelength in a visible light range of the color filter for the green component and the transmittance of a peak wavelength in a visible light range of the color filter for to the red component are both higher than the transmittance of a peak wavelength in a visible light range of the color filter for to the blue component.

In another aspect, the present invention provides an LCD apparatus including a color filter primarily for a blue component, a color filter primarily for a green component and a color filter primarily for a red component; an LCD panel arranging the color filters therein and having a plurality of pixels, each of the pixels being associated with one of the color components of the color filters; and a side lighting-type backlight unit disposed under the LCD panel, the backlight unit including a light guide and a light source disposed at least at one lateral end of the light guide, the light guide directing light emitted generally in a lateral direction from the light source towards the LCD panel thereabove to enable a transmission display of an image data controlled by the LCD panel, the backlight unit further including a reflecting layer on a side opposite to a side facing the LCD panel to reflect light coming towards the reflecting layer from the light guide, the reflecting layer further reflecting ambient light originating from an exterior, passing though the LCD panel and through the light guide, back to the light guide and the LCD panel, thereby enabling a reflection display of the image data controlled by the LCD panel in addition to the transmission display using the light source, wherein the color filters are configured such that a transmission intensity in a blue wavelength range of the color filter for the red component is higher than a transmission intensity in an absorption wavelength range of the color filter for the blue component and is higher than a transmission intensity in an absorption wavelength range of the color filter for the green component, and such that the transmittance of a peak wavelength in a visible light range of the color filter for the green component and the transmittance of a peak wavelength in a visible light range of the color filter for to the red component are both higher than the transmittance of a peak wavelength in a visible light range of the color filter for to the blue component.

According to the present invention, among other things, the LCD apparatuses can perform a display using the light emitted from the back lighting and a display using ambient light without dividing each pixel into a transmission display area and a reflection display area, thereby achieving a high visual quality.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
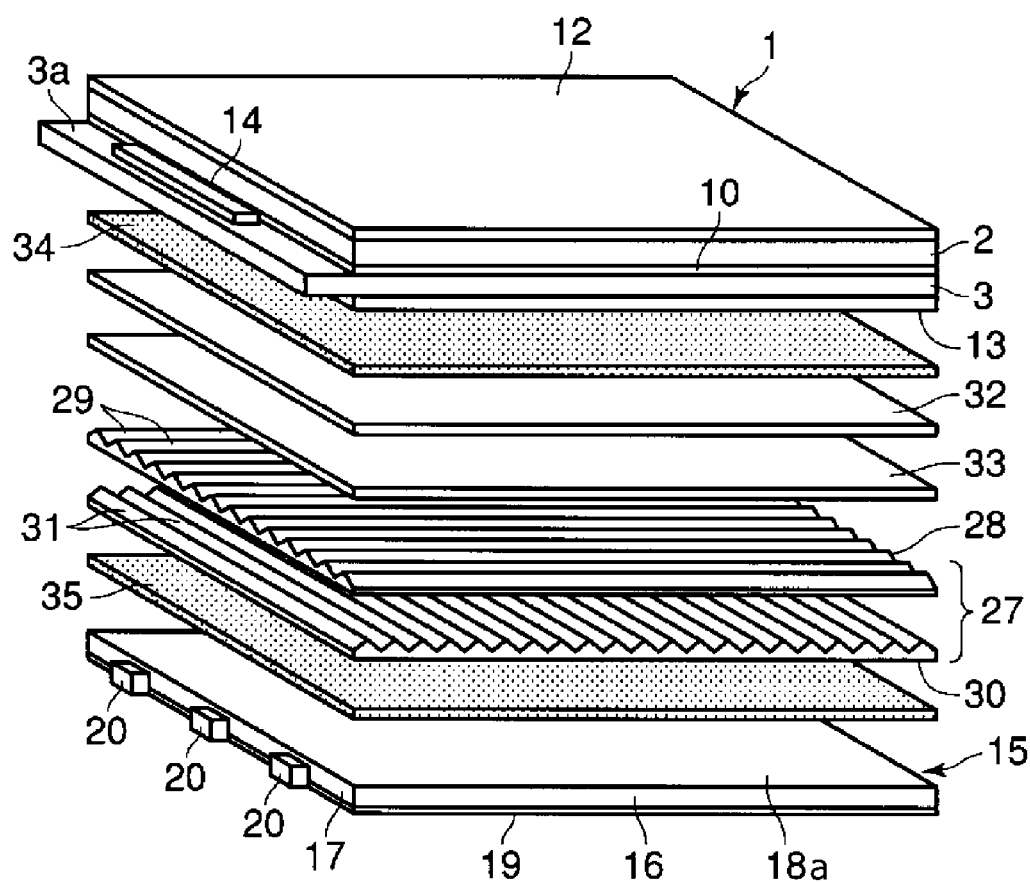
FIG. 1 is an exploded perspective view showing an LCD apparatus.
Figure 2:
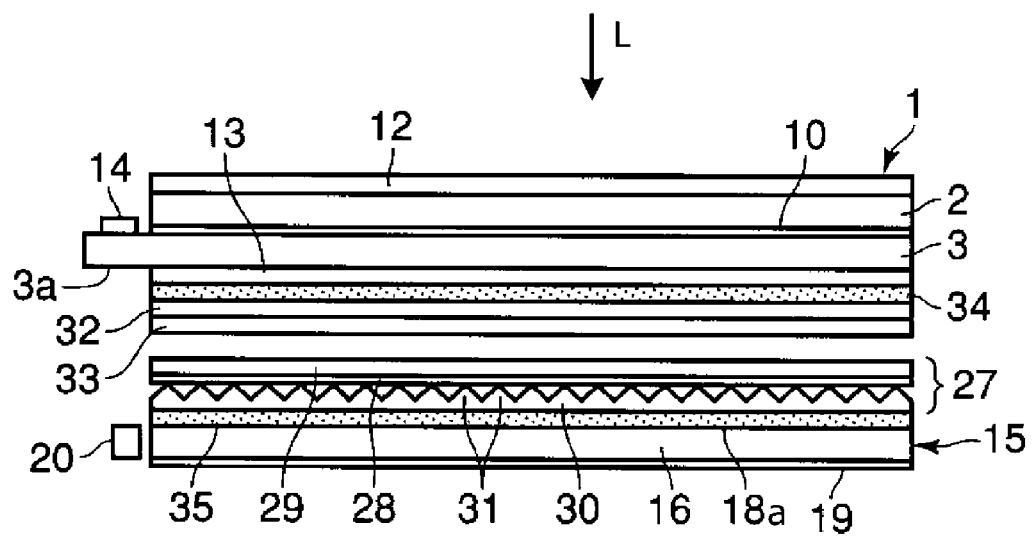
FIG. 2 is a side view showing the LCD apparatus.

An LCD apparatus in accordance with various embodiments of the present invention enables a display using ambient light by reflecting the ambient light with a side light type back lighting, in addition to a transmission display that performs a display with light emitted from the side light type backlight unit. In this embodiment, as shown in FIGS. 1 and 2, the LCD apparatus is provided with an LCD panel 1; a light source unit 15 emitting illumination light toward one surface of the LCD panel 1; a collecting unit 27 located between the light source unit 15 and the LCD panel 1; a retardation film 33 located between the collecting unit 27 and the LCD panel 1; a reflective polarizer 32 located between the retardation film 33 and the LCD panel 1; a first diffusing plate 34 located between the reflective polarizer 32 and the LCD panel 1; and a second diffusing plate 35 located between the collecting unit 27 and the light source unit 15.

Figure 3:
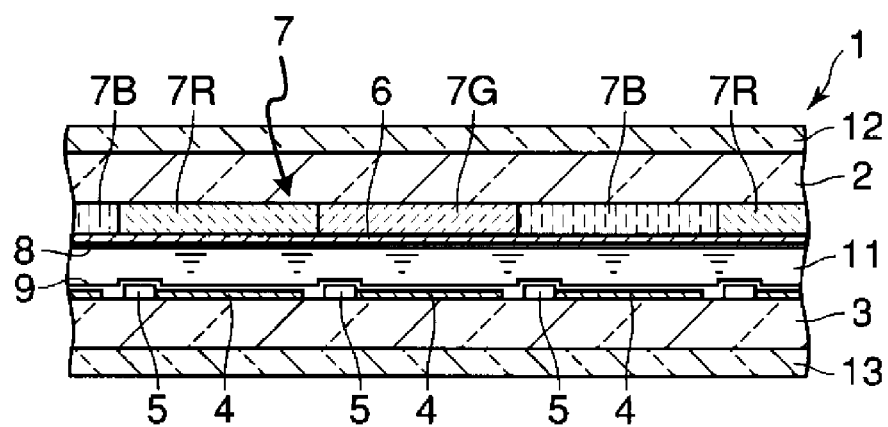
FIG. 3 is a close-up cross-section view of an LCD panel.

Referring to FIG. 3, the LCD panel 1 is provided with a pair of transparent substrates 2, 3 having a prescribed space in between and facing with respect to each other; a liquid crystal layer 11 disposed between the pair of transparent substrates 2, 3; and a pair of polarizers 12, 13 located so that it sandwiches the pair of transparent substrates 2, 3 and the transmission axes thereof intersect at a right angle with each other.

Figure 4:
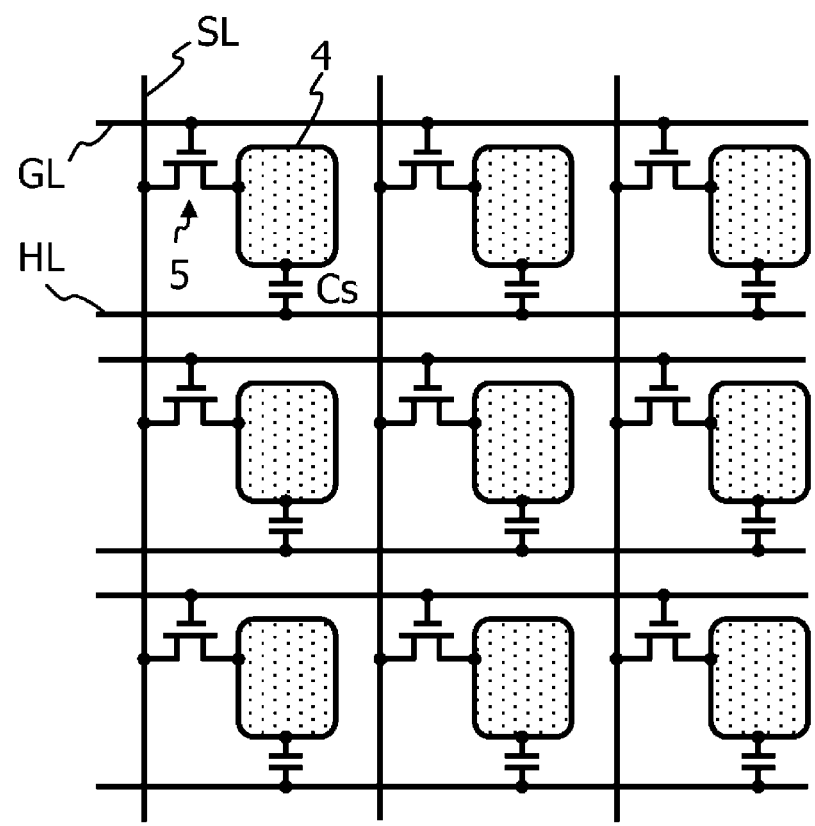
FIG. 4 is a pattern diagram showing an arrangement of pixel electrodes.

As shown in FIG. 4, in the first transparent substrate 3 of the pair of transparent substrates 2, 3, there are provided on a surface facing the second transparent substrate 2: a plurality of signal lines SL arranged so as to extend in parallel with each other, a plurality of scanning lines GL arranged so as to intersect with the plurality of signal lines SL at right angles, a plurality of pixel electrodes 4 located so as to correspond to intersections of the signal lines SL and the scanning lines GL and composed of transparent conductive layer such as ITO and the like, and a plurality of TFTs (thin film transistor) 5 for the respective pixel electrodes 4. That is to say, the plurality of pixel electrodes 4 is arranged in matrix so that each of the pixels is provided with the respective pixel electrode 4. The scanning lines GL are arranged in rows so as to be able to provide the TFTs 5 with gate signals in the respective pixel rows, and the signal lines SL are arranged in columns so as to be able to provide the pixel electrodes 4 with display signal voltages via the TFTs.

On the first transparent substrate 3, auxiliary capacity lines HL are arranged in rows, and an auxiliary capacity Cs is formed in each of the pixels by an insulating layer disposed between the auxiliary capacity lines HL and the pixel electrodes 4. The auxiliary capacity lines HL are set at the same potential as an opposite electrode 6 described later, for example.

Each of the TFTs 5 may include: a gate electrode formed on the substrate surface of the first transparent substrate 3; a gate insulating layer composed of a transparent insulating layer and deposited so as to cover the gate electrode therewith; an i-type semiconductor layer formed on the gate insulating layer so as to face the gate electrode via the gate insulating layer; and a drain electrode and a source electrode that are formed on respective sides of the i-type semiconductor layer via n-type semiconductor layers. The source electrode of the TFT 5 is connected to the corresponding pixel electrode 4, the gate electrode thereof is connected to the corresponding scanning line and the drain electrode thereof is connected to the corresponding signal line.

Figure 5:
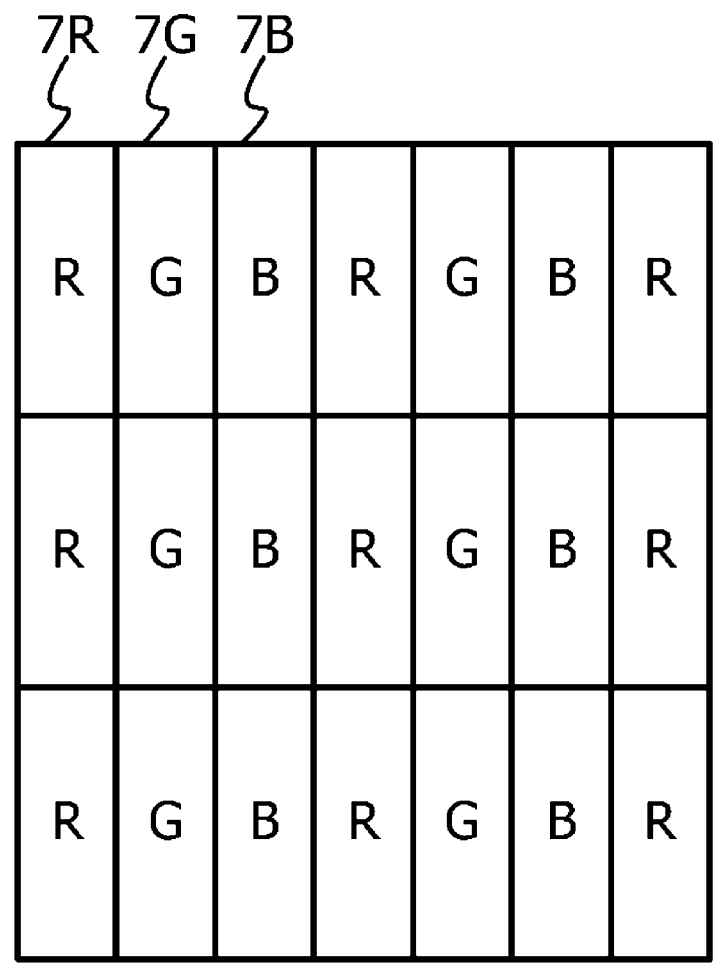
FIG. 5 show an explanatory arrangement of a color filter.

On the other hand, as shown in FIG. 3, in the second transparent substrate 2 of the pair of transparent substrates 2, 3, there are provided a light-shielding layer that includes openings in regions substantially corresponding to the pixel electrodes 3, a color filter 7, and the opposite electrode 6 on a surface facing the first transparent substrate 3. The light-shielding layer can be composed of an opaque metallic film or an opaque resin film and is formed so that the opening area for transmitting light is equal for every pixel. That is, the LCD panel 1 is configured to have the same aperture ratio in each of the pixels. The color filter 7 is composed of the color filter for the red component 7R, the color filter for the green component 7G and the color filter for the blue component 7B, for example, as shown in FIG. 5. The color filter having the corresponding color component is arranged for each of the pixels. The opposite electrode 6 is composed of a transparent conductive film such as ITO and the like, and is formed so as to be able to be set at the same potential for every pixel. For instance, the opposite electrode 6 is formed as a single film to cover the entire array of the color filter 7 in the pixels. The spectral transmittance characteristics of the color filter having the respective color components will be given later.

Here, on the pixel electrodes 4 and on the opposite electrode 6 in the respective pixels, alignment films 8, 9 for controlling an initial orientation of liquid crystal molecules in the liquid crystal layer 11 are applied, respectively. The alignment films 8, 9 are provided with an alignment treatment, by which the liquid crystal molecules are twisted/oriented at a twisting angle of 90 degrees, for example, when a voltage is not applied between the pixel electrodes 4 and the opposite electrode 6.

The pair of transparent substrates 2, 3 is bonded with a sealing material 10, which is disposed in a frame shape so as to surround an image display area that arranges the plurality of pixel electrodes 4 therein as described above. The above-described liquid crystal is encapsulated in the region surrounded by the sealing material 10 of the frame shape.

As shown in FIGS. 1 and 2, the first transparent substrate 3 of the LCD panel 1 is located opposite the second transparent substrate 2 so as to project from an edge of the second transparent substrate 2, and a driver circuit 14 is mounted on the projecting portion 3a. The driver circuit 14 is electrically connected to a plurality of terminals that is formed on the projecting portion 3a. The driver circuit 14 provides the signal lines SL with the display signal voltages via these terminals while it provides the scanning lines GL with the scanning signals, and also provides the auxiliary capacity lines HL and the opposite electrode 6 with a common voltage, for example.

The driver circuit 14 changes the tilt angle or the azimuth angle of the liquid crystal molecules relative to the transmission axis of the polarizers 12, 13 by controlling a voltage applied to the liquid crystal layer 11 via the pixel electrodes 4 and the opposite electrode 6, and thereby controls an amount of transmitted light in the respective pixels of the LCD panel 1.

The light source 15, as shown in FIGS. 1 and 2, is the so-called side light type backlight and is provided with a light guide 16 located so as to face the LCD panel 1 and composed of a transparent plate-shape member whose area is larger than the image display area of the LCD panel 1; a reflecting plate 19 located so as to face the light guide 16; and a plurality of light-emitting devices 20 emitting light toward an edge of the light guide 16.

The plurality of light-emitting devices 20 emits light when the LCD device performs the transmission display with the illuminating light emitted from the light source 15, and each of the light-emitting devices 20 is provided with a red LED emitting light having a red component, a green LED emitting light having a green component, and a blue LED emitting light having a blue component, for example. It is preferable for the light-emitting devices 20 to be able to appropriately control light-emission/non-emission (or its intensity) according to the brightness of the ambient light under a use environment of the LCD apparatus.

Figure 6:
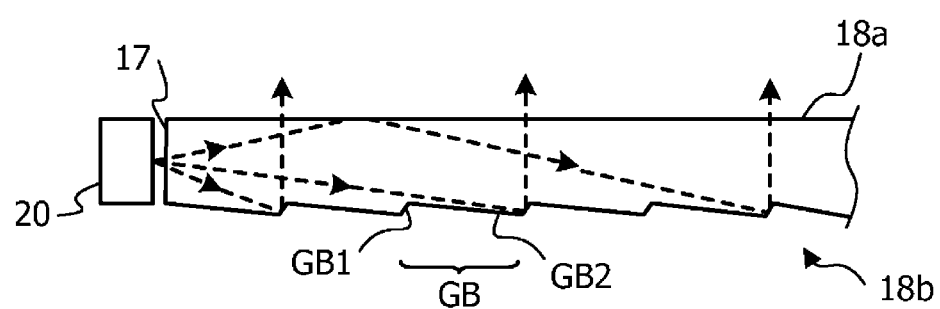
FIG. 6 is an explanatory diagram showing trajectories of light that is emitted from a light source and guided by a light guide.

As shown in FIG. 6, the light guide 16 is to emit light from a principal surface 18a (hereinafter referred to as "first principal surface 18a") on the side facing the LCD panel 1 towards the LCD panel 1 by guiding the lights having the respective color components emitted from the light-emitting devices 20 through the end surface 17 of the light guide 16. Here, on another principal surface 18b (hereinafter referred to as "second principal surface 18b") on the opposite side of the first principal surface 18a, a plurality of linear knurls GB, for example, is formed in parallel with the end surface 17 that is illuminated with the light emitted from the light-emitting devices 20. A cross-section shape of the linear knurls GB is formed, for example, such that two sides GB1, GB2 forming an apex form inclination angles relative to the first principal surface 18a of the light guide 16 that are different from each other. Specifically, the linear knurls GB are formed so that the inclination angle of the side GB1 located close to the light-emitting devices 20 is larger than that of the other side GB2.

The light guide 16, as shown by dash lines in FIG. 6, reflects the light that is emitted from the light-emitting devices 20 and entered from the end surface 17 on inner surfaces thereof, and emits the lights from the first principle surface 18a towards the LCD panel 1. The light guide 16 can be composed of a transparent material having a larger refractive index than that of air, such as acrylic having a refractive index of 1.5 or so, for example.

The reflecting plate 19 reflects light that is emitted from the light-emitting devices 20 and that has passed through the second principal surface 18b of the light guide 16 back towards the light guide 16, and also reflects ambient light that has passed through the LCD panel 1 and the light guide 16 back towards the light guide 16 and the LCD panel 1. That is to say, the reflecting plate 19 functions as a reflecting plate for reflecting the ambient light when the LCD apparatus performs the reflection display using the ambient light. And when the LCD apparatus performs the transmission display using the light emitted from the light-emitting devices 20, the reflecting plate 19 improves the use efficiency of the light. As the reflecting plate 19, for instance, a glass plate or a plastic plate that has a metal such as silver, aluminum and the like deposited thereon by evaporation can be used.

Figure 7:
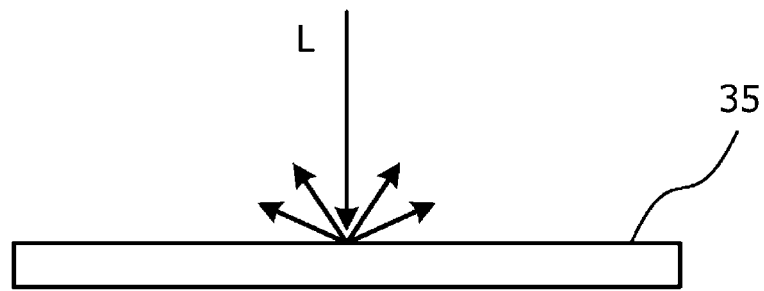
FIG. 7 is an explanatory diagram for a backward scattering caused by a diffusing plate.

The second diffusing plate 35 is to decrease the surface variation of light emitted from the light guide 16 by diffusing the light emitted from the first principal surface 18a of the light guide 16, and is composed of a transparent sheet that has light scattering particles dispersed therein so that the haze value thereof is about 55% to about 85%. As shown in FIG. 7, the second diffusing plate 35 scatters a part of the ambient light L that passes through the LCD panel 1 in reverse directions, and therefore the second diffusing plate 35 operates as a supplemental reflecting plate when the LCD apparatus performs the reflection display using the ambient light.

Figure 8:
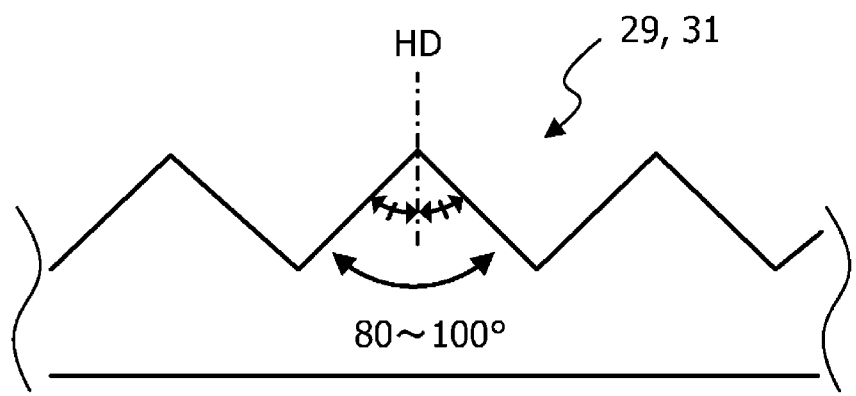
FIG. 8 is a partial enlarged cross-section view of a prism.

The collecting unit 27 is to collect light in order to direct the light that is emitted from the light guide 16 toward the LCD panel 1 and diffused by the second diffusing plate 35 towards the LCD panel 1 efficiently. The collecting unit 27 includes a first prism array 28 and a second prism array 30, which are composed of a transparent sheet member such as acrylic resin and the like. On one surface of the first prism array 28, a plurality of linear prisms 29 is formed so as to be parallel to each other. The first prism array 28 is disposed so that the extending direction of the plurality of linear prisms 29 forms a right angle with the extending direction of the plurality of knurls GB formed on the light guide 16, for example. On one surface of the second prism array 30, a plurality of linear prisms 31 is formed so as to be parallel to each other. The second prism array 30 is disposed so that the extending direction of the plurality of linear prisms 31 is in parallel with the extending direction of the plurality of knurls GB formed on the light guide 16, for example. As shown in FIG. 8, each of the linear prisms 29, 31 is in an isosceles triangle shape that is symmetric with respect to a normal line HD of the LCD panel 1, and an apex angle is within the range of about 80 degrees to about 100 degrees. More preferably, the apex angle is formed at 90 degrees in its cross-sectional shape.

Figure 9:
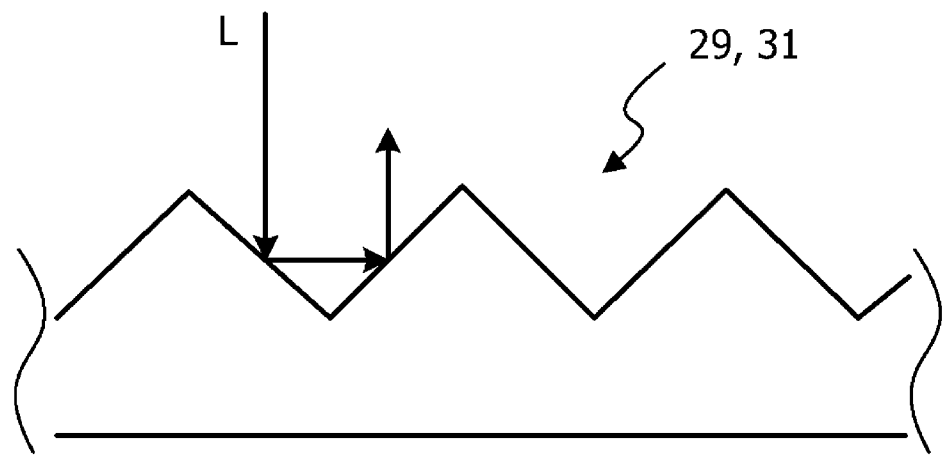
FIG. 9 is an explanatory diagram depicting a ray trajectory reflected by the prism.

As shown in FIG. 9, the prism arrays 28, 30 reflect a part of the ambient light L that has passed through the LCD panel 1 at the respective slanted surfaces that constitute the linear prisms 29, 31, and therefore, the prism arrays 28, 30 also operate as supplemental reflecting plates when the LCD apparatus performs the reflection display using the ambient light.

Figure 10:
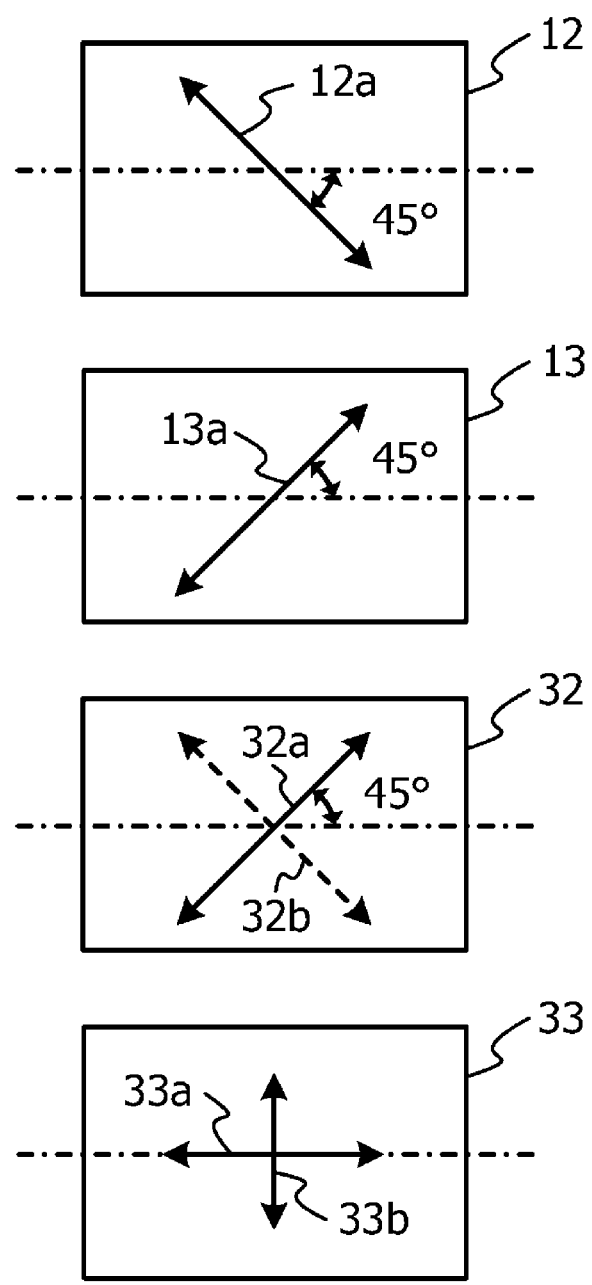
FIG. 10 is an explanatory diagram for the directions of respective optical axes.

As shown in FIG. 10, the reflective polarizer 32 has a transmission axis 32a and a reflection axis 32b in directions normal to each other, and the reflective polarizer 32 passes light having a polarization component that is parallel to the transmission axis 32a in the incoming light and reflects light having a polarization component that is parallel to the reflection axis 32b in the incoming light. In this example, the reflective polarizer 32 is disposed such that the transmission axis 32a thereof becomes parallel to the transmission axis 13a of the polarizer 13, which is located closer to the reflective polarizer 32 as compared to the polarizer 12. The transmission axis 12a of the polarizer 12 is oriented so as to form a right angle with the transmission axis 13a of the polarizer 13 as described above. However, the pair of polarizers 12, 13 can be set up in different configurations depending on the orientation mode of the liquid crystal in the liquid crystal layer 11.

The retardation film 33 has a slow axis 33a and a fast axis 33b in a normal direction with respect to each other, and the slow axis 33a and the fast axis 33b form 45 degrees relative to the transmission axis 32a and the reflection axis 32b of the reflective polarizer 32 respectively. In the retardation film 33, the optical constants thereof are configured to generate a phase difference of a quarter wavelength between light having a polarization component that is parallel to the slow axis 33a and light having a polarization component that is parallel to the fast axis 33b.

By arranging the reflective polarizer 32, the retardation film 33 and the reflecting plate 19 as described above, among the light components emitted from the light-emitting devices 20 via the light guide 16, light having a polarization plane in a direction perpendicular to the transmission axis 13a of the polarizer 13 emitted towards the LCD panel 1 is reflected by the reflective polarizer 32, and such light is converted into light having a polarization plane parallel to the transmission axis 13a of the polarizer 13 and is directed back towards the LCD panel 1 again to contribute to the display. Therefore, the use efficiency of the light emitted from the light-emitting devices 20 can be improved.

The first diffusing plate 34 is to prevent an occurrence of a moiré that may be generated due to interference between the arrangement of the pixels of the LCD panel 1 and the prism arrays 28, 30 in the collecting unit 27, and is composed of a transparent sheet that has light scattering particles dispersed therein so that the haze value thereof is about 20% to about 50%. Like the second diffusing plate 35, the first diffusing plate 34 reflects a part of the ambient light passing the LCD panel 1, and therefore the first diffusing plate 34 also operates as a supplemental reflecting plate when the LCD apparatus performs the reflection display using the ambient light.

In the above-described LCD apparatus, when an applied voltage is controlled so that the liquid crystal layer 11 of the LCD panel 1 can pass light, the LCD apparatus enables the ambient light to pass through the LCD panel 1 and to enter toward the light guide 16 regardless of the light-emission of the light-emitting devices 20. In the case, the ambient light entering toward the light guide 16 passes the first principal surface 18a of the light guide 16 and the second principal surface 18b in that order, and is reflected by the reflecting plate 19. Then the ambient light passes the second principal surface 18b of the light guide 16 and the first principal surface 18a in that order, and returns to the LCD panel 1. That is to say, the above-described LCD apparatus can perform the reflection display using the ambient light in addition to the transmission display using the light emitted from the light-emitting devices 20 without dividing each pixel into a transmission display area and a reflection display.

In the above-described LCD apparatus, portions of the ambient light are reflected at the first diffusing plate 34, the second diffusing plate 35, the prism arrays 28, 30 and the like besides the ambient light reflection at the reflecting plate 19 in the light source 15. Therefore, those multiple reflective surfaces between the LCD panel 1 and the reflecting plate 19 can generate a blur on screen image of the LCD panel 1 that may be projected onto the reflecting plate 19 by the ambient light. Accordingly, even when a certain distance exists between the LCD panel 1 and the reflecting plate 19, because an image displayed on the LCD panel 1 is not recognizable as a double image, the visual quality of the display can be improved.

Figure 11:
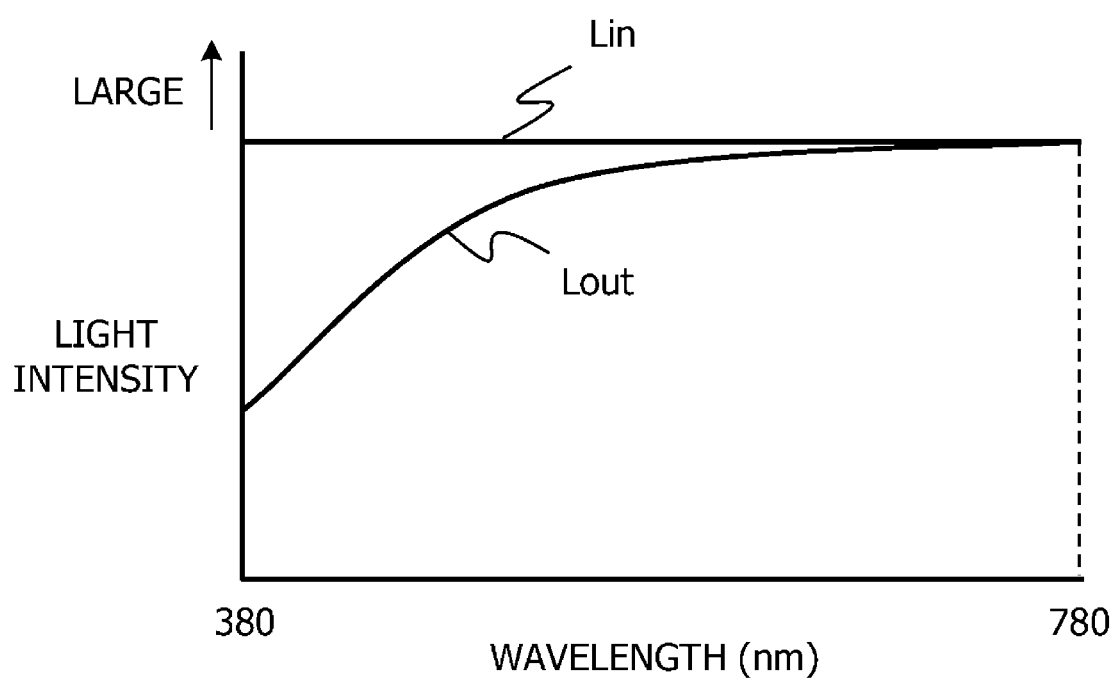
FIG. 11 is an explanatory diagram showing a relation between a spectral intensity of light before passing/returning through a light guide and a spectral intensity of light after passing/returning through a light guide.

In the light guide 16 of the light source 15, the knurls GB having the above-described slanted surfaces are designed such that the light that has been emitted from the light-emitting devices 20 through the end surface 17 is emitted from the first principal surface 18a towards the LCD panel 1. With respect to the ambient light, through the course of (i) passing through the first principal surface 18a of the light guide 16 and the second principal surface 18b in that order, (ii) being reflected by the reflecting plate 19, then (iii) passing through the second principal surface 18b of the light guide 16 and the first principal surface 18a and (iv) returning to the LCD panel 1 again, its shorter wavelength components in the visible light range of the ambient light tends to be strayed relatively easily as compared with its longer wavelength components. Accordingly, as shown in FIG. 11, the ambient light Lin directed from the LCD panel 1 towards the light guide 16, becomes yellowish or reddish light Lout when returning from the light guide 16 to the LCD panel 1.

Therefore, in an embodiment of the present invention, the spectral transmittance characteristics of the color filter 7 are adjusted for the respective color components in accordance with the above-mentioned change in the color tone in the ambient light caused by passing/returning through the light guide 16.

Specifically, when the ambient light has the same spectral characteristic as the standard C light source, the color temperature of ambient light emitted from the light guide 16 toward the LCD panel 1 after passing/returning through the light guide 16 becomes lower than the color temperature of the C light source due to the above-described reason. Accordingly, by adjusting the spectral transmittance characteristics of for the color filter 7 for the respective color components such that the color temperature of the composite light combining light emitted from the light source C after passing/returning through the red color filter 7R, light emitted from the light source C after passing/returning through the green color filter 7G and light emitted from the light source C after passing/returning through the blue color filter 7B becomes higher than the color temperature of the C light source, the variations in the intensity of the transmitted light among wavelength ranges caused by passing/returning through the light guide 16 can be alleviated or substantially eliminated.

Figure 12:
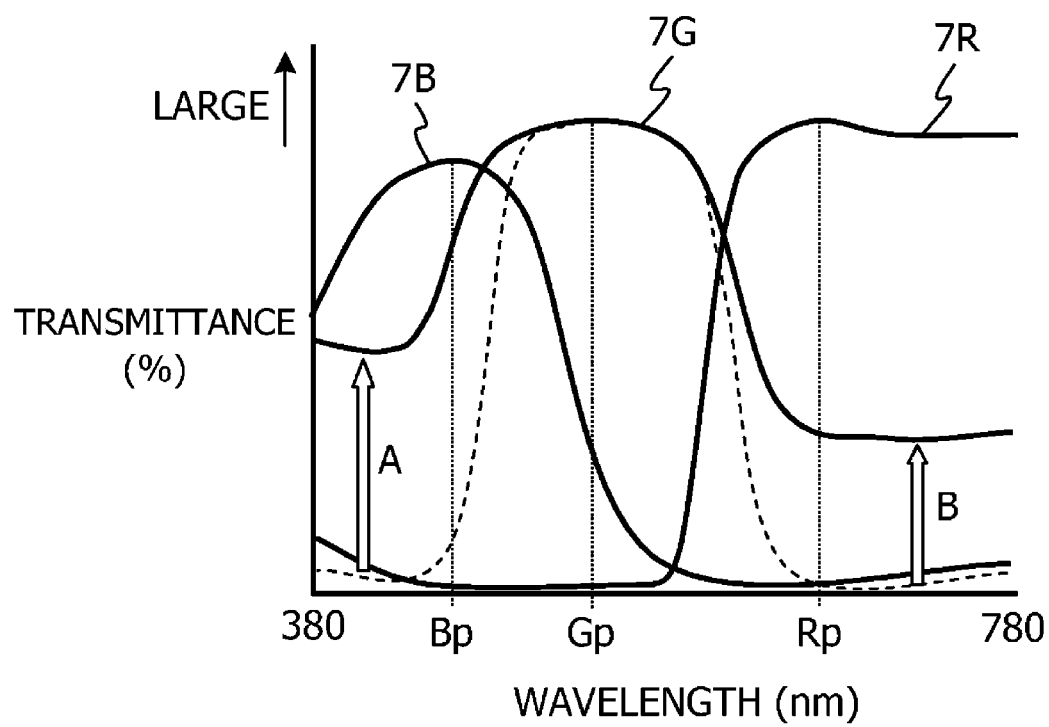
FIG. 12 shows the spectral transmittances of respective color components of a color filter.
Figure 13:
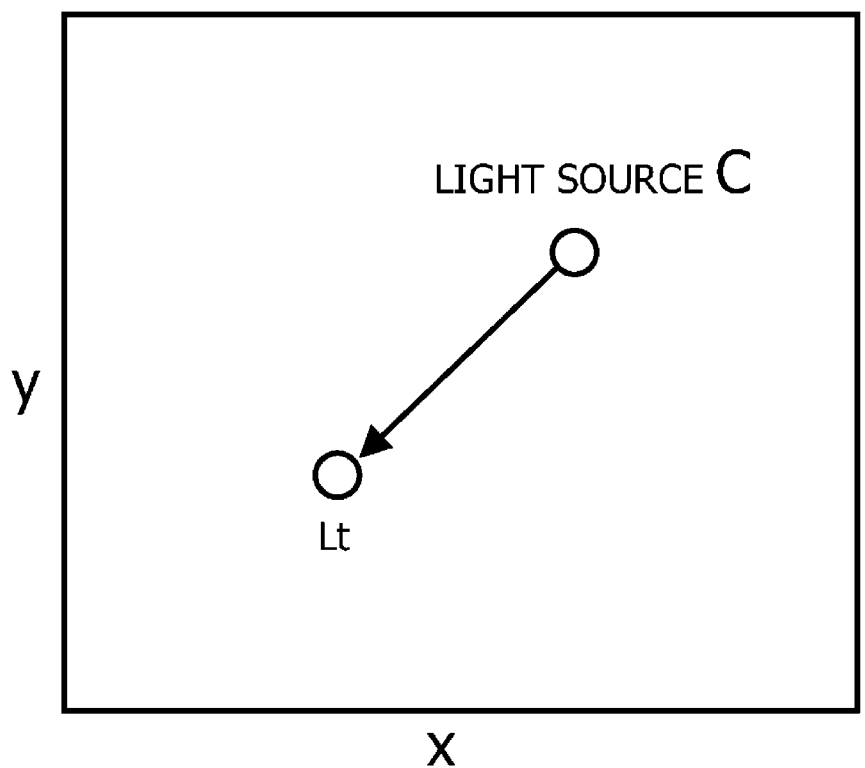
FIG. 13 is an explanatory diagram for a relation between the color temperature of light emitted from the C light source before passing/returning through the color filter and the color temperature of composite light composed of light components originating from the C light source after passing/returning the color filer having the respective corresponding color components.

For example, as shown by the arrow A in FIG. 12, by adjusting the transmission intensity in a blue wavelength range of the color filter 7G for the green component so that the transmission intensity becomes higher than a transmission intensity in an absorption wavelength range of the color filter 7B for the blue component and higher than a transmission intensity in an absorption wavelength range of the color filter 7R for the red component, the coordinate point of the above-described composite light Lt can be located toward a blue side (a high color temperature side) than the coordinate point of the light source C in a CIE1931 chromaticity diagram, as shown in FIG. 13. In this case, in order to maintain the color tone of the color filter for the green component 7G itself, the transmission intensity in a red wavelength range of the color filter for the green component 7G may be readjusted as shown by the arrow B in FIG. 12.

The color filters having such characteristics can be manufactured using conventional materials, such as color pigments and dyes, and by appropriately mixing these materials in a host material so as to yield desired transmissions characteristics.

As described above, by adjusting the spectral transmittance characteristics of the color filter when displaying white (i.e., when all the pixels for three color components transmits at their maximum transmittance) using the ambient light that has passed through the color filter 7, the light guide 16, the reflecting plate 19, the light guide 16 and the color filter 7 in that order, the color temperature of the reference white display can be set closer or substantially equal to that of the C light source, and therefore the visual quality of the reflection display using the ambient light can be improved.

In the above-described examples, to achieve a high-brightness display using the ambient light under the non-emission condition of the light-emitting devices 20, the color temperature adjustment is carried out without decreasing the transmittance of the peak wavelength range in the color filter 7G for the green component or decreasing the transmittance of the peak wavelength range in the color filter 7R for the red component relative to the transmittance of the peak wavelength range in the color filter 7B for the blue component. That is to say, even after carrying out the color temperature adjustment, the transmittance of the peak wavelength Gp in the color filter 7G for the green component and the transmittance of the peak wavelength Rp in the color filter 7R for the red component both maintain a level higher than the transmittance of the peak wavelength Bp in the color filter 7B for the blue component in the visible light range (approximately 380 nm to 780 nm). By decreasing the transmittance of the peak wavelength Gp in the color filter 7G and the transmittance of the peak wavelength Rp in the color filter 7R relative to the transmittance of the peak wavelength Bp in the color filter 7B, the coordinate point of the above-described resultant composite light Lt could be located toward the blue side (the high color temperature side) than the coordinate point of the C light source. However, such a method would cause a decrease of the visual quality due to a decrease of the light use efficiency.

Here, the transmission intensity in the blue wavelength range of the color filter 7G for the green component mentioned herein can be defined as an average transmittance between approximately 380 nm to 450 nm. The transmission intensity of the absorption wavelength range in the color filter 7B mentioned herein can be defined as an average transmittance between approximately 500 nm to 780 nm. The transmission intensity of the absorption wavelength range in the color filter 7R mentioned herein can be defined as an average transmittance between approximately 380 nm to 580 nm. The transmission intensity in the red wavelength range of the color filter 7G for the green component mentioned herein can be defined as an average transmittance between approximately 620 nm to 780 nm.

When the spectral transmittance of the color filter 7B for the blue component is defined as $B(\lambda)$ the spectral transmittance of the color filter corresponding to the green component 7G is defined as $G(\lambda)$ and the spectral transmittance of the color filter corresponding to the red component 7R is defined as $R(\lambda)$ a white reflection spectrum $W^2(\lambda)$ of these elemental color filters can be expressed by Formula 1 with consideration of a possibility of light that passes/returns different color components of the color filter when the light passes/returns.

$$W^2(\lambda) = \left\{ \frac{B(\lambda) + G(\lambda) + R(\lambda)}{3} \right\}^2 \quad \text{Formula 1}$$

A relation between this reflection spectrum $W^2(\lambda)$ and a coordinate point (x, y) on the chromaticity diagram in CIE1931 can be expressed by Formula 2.

$$X = K \int_{380}^{780} S(\lambda) \cdot x(\lambda) \cdot W^2(\lambda) \cdot d\lambda \quad \text{Formula 2}$$

$$Y = K \int_{380}^{780} S(\lambda) \cdot y(\lambda) \cdot W^2(\lambda) \cdot d\lambda$$

$$Z = K \int_{380}^{780} S(\lambda) \cdot z(\lambda) \cdot W^2(\lambda) \cdot d\lambda$$

$$K = \frac{100}{\int_{380}^{780} S(\lambda) \cdot y(\lambda) \cdot d\lambda}$$

$$x = \frac{X}{X + Y + Z}$$

$$y = \frac{Y}{X + Y + Z}$$

Here, X, Y and Z are spectral tristimulus values in the XYZ color system. $x(\lambda)$, $y(\lambda)$ and $z(\lambda)$ are color-matching functions in the XYZ color system. In addition, $S(\lambda)$ is the spectral distribution of the C light source.

When adjusting the spectral transmittance characteristics of the color filter 7 for the respective color components as described above, it is preferable to adjust the spectral characteristics of the light emitted from the light source 15, that is, the spectral characteristics of the light from the first principal surface 18a of the light guide 16 that originates from the light-emitting devices 20 under a dark-room environment.

For example, it is preferable to adjust the spectral characteristic of the light emitted from the light source 15 such that the color temperature of the composite light combining (i) light that is emitted from the light source 15 and once passing through the red color filter 7R adjusted as described above, (ii) light that is emitted from the light source 15 and once passing through the green color filter 7G adjusted as likewise described above and (iii) light that is emitted from the light source 15 and once passing through the blue color filter 7B adjusted as likewise described above is made substantially equal to the color temperature of the C light source, for example. If adjusted as described above, even when the visual quality is improved for the ambient light, it becomes possible to maintain the visual quality at a high level in the display using the light emitted from the light-emitting devices 20. Such adjustment of the spectral characteristics of the light source can be achieved by appropriately designing the red LED, the blue LED and the Green LED incorporated in the light emitting device 20, or adjusting phosphor particles contained in the phosphor layer in the case of light-conversion type LED (which will be described below).

In the above-described exemplary embodiments, cases where the orientation mode of the liquid crystal is a TN mode, in which the liquid crystal molecules of the liquid crystal layer 11 are twisted and oriented at a twisted angle of 90 degrees when a voltage is not applied between the pixel electrodes 4 and the opposite electrode 6, are described. However, the orientation mode of the liquid crystal is not limited to the TN mode. For instance, the present invention can be applied to an orientation mode of a vertical orientation type, in which the liquid crystal molecules of the liquid crystal layer 11 are oriented at right angles with respect to the substrate surface when no voltage is applied between the pixel electrodes 4 and the opposite electrode 6, and they are oriented inclinedly when a voltage is applied between the pixel electrodes 4 and the opposite electrode 6.

In the above-described exemplary embodiments, the orientation of the liquid crystal molecules is controlled by a longitudinal electric field. However, a structure that controls the orientation state of the liquid crystal molecules by a transverse electric field can be used with the present invention.

Figure 14:
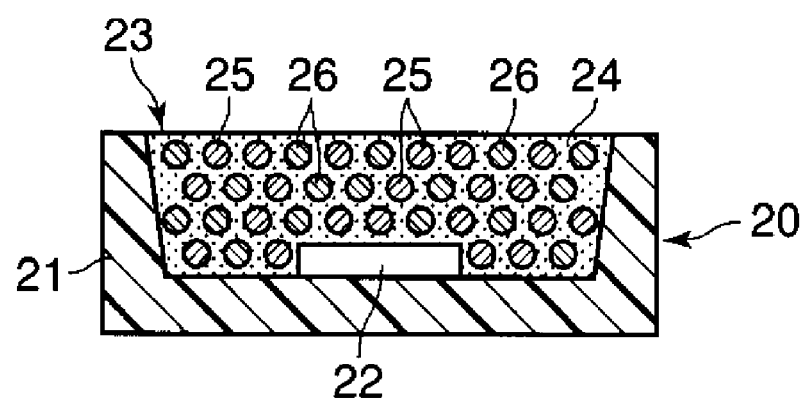
FIG. 14 is a cross-section view of an example of the light source.

In the above-described exemplary embodiments, a case that the light-emitting devices 20 are provided with the red LED, the green LED and the blue LED is described. Alternatively, as shown in FIG. 14, each of the light-emitting devices 20 may be of type having a single blue LED located in a central portion on an inner bottom surface of a boxy casing 21 having an opening made by a resin molding. In this type, in the casting 21, a phosphor layer is provided to include a red phosphor material 25 and a green phosphor material 26 dispersed in particle shapes at a prescribed ratio in a transparent material 24 (which is made of a transparent resin and the like) (hereinafter called a red/green phosphor layer). In the case, because only a single LED can be used for each light emitting device 20, more stable operation can be easily achieved even if light turn-on and turn-off operations are frequently switched back and forth in accordance with the changing brightness of the use environment.

In the above-described exemplary embodiments, the coordinate point of the composite light Lt is adjusted to be moved to the blue side (high color temperature side) than that of the C light source by adjusting the transmission intensity in the blue wavelength range of the color filter 7G for the green component 7G. Alternatively or in addition, it is possible to set the coordinate point of the composite light Lt toward the blue side (high color temperature side) than that of the C light source by adjusting the transmission intensity in the blue wavelength range of the color filter 7R for the red component.

Figure 15:
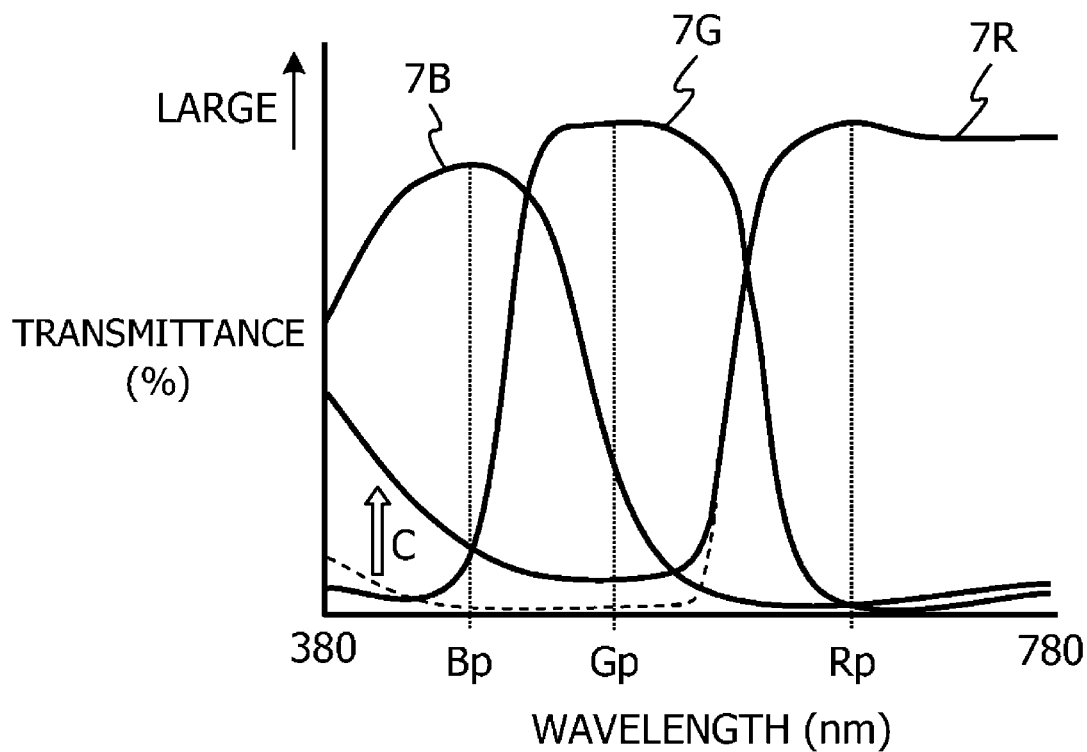
FIG. 15 shows another example of the spectral transmittances of the respective color components of the color filter.

For example, as shown by the arrow C in FIG. 15, by adjusting the transmission intensity in the blue wavelength range of the color filter 7R for the red component so as to become higher than the transmission intensity in the absorption wavelength range of the color filter 7B for the blue component and the transmission intensity in the absorption wavelength range of the color filter 7G for the green component, the above-described coordinate point of the composite light Lt can be configured to be located toward the blue side (high color temperature side) than the coordinate point of the C light source on the CIE1931 chromaticity diagram as shown in FIG. 13.

In this case, the transmission intensity in the blue wavelength range of the color filter 7R for the red component can be defined as an average transmittance between approximately 380 nm and 450 nm. The transmission intensity in the absorption wavelength range of the color filter 7B for the blue component can be defined as an average transmittance between approximately 500 nm and 780 nm. The transmission intensity in the absorption wavelength range of the color filter 7G for the green component can be defined as an average transmittances between approximately 380 nm and 450 nm and between approximately 650 nm and 780 nm.

It will be apparent to those skilled in the art that various modification and variations can be made in the present invention without departing from the spirit or scope of the invention. Thus, it is intended that the present invention cover modifications and variations that come within the scope of the appended claims and their equivalents.

For example, in the above embodiments, a focus is on maintaining the color coordinate of the white display by the LCD display. However, a more fine tuning of color filters is possible. For example, not only white display, but also other reference color displays, such as reference blue, reference red, etc., can be additionally used to improve color rendering and reproducibility of true color both for the case of using ambient light and for the case of using the internal light source.

What is claimed is:

1. An LCD apparatus, comprising:
a liquid crystal panel including display pixels in which a red color filter, a green color filter and a blue color filter are disposed; and
a side lighting type backlight including a reflecting layer and a light guide disposed between the reflecting layer and the liquid crystal panel,
wherein the reflecting layer reflects ambient light, which passed through the liquid crystal panel and the light guide in sequence, in such a way that the ambient light reflected by the reflecting layer passes through the light guide and illuminates the liquid crystal panel,
wherein the red color filter, the green color filter, and the blue color filter are configured such that a spectral characteristic of composite light has a compensatory characteristic, said composite light being defined as light combining:
(i) light that emerges from the red color filter when reference light is let to pass and return through the red color filter,
(ii) light that emerges from the green color filter when the reference light is let to pass and return through the red color filter, and
(iii) light that emerges from the blue color filter when the reference light is let to pass and return through the blue color filter, and
wherein said compensatory characteristic is such that said spectral characteristic of the composite light substantially compensates for variations in light intensity among wavelength ranges of the red, green, and blue color filters that occur in light emerging from the light guide when the reference light is let to pass and return through the light guide with the reflecting layer.

2. The LCD apparatus according to claim 1, wherein the light guide has such a characteristic that the color temperature of light that emerges from the light guide when the reference light, originally having a predetermined reference color temperature is let to pass and return through the light guide is lower than said predetermined reference color temperature, and
wherein the red, green and blue color filters are configured such that the color temperature of the composite light is higher than the predetermined reference color temperature.

3. The LCD apparatus according to claim 2, wherein the reference color temperature is the color temperature of the light source C.

4. An LCD apparatus, comprising:
a liquid crystal panel including display pixels in which a red color filter, a green color filter and a blue color filter are disposed; and
a side lighting type backlight including a reflecting layer and a light guide disposed between the reflecting layer and the liquid crystal panel, the light guide having such characteristic that the color temperature of light, which originates from the light source C and is let to pass and return through the light guide, is lower than the color temperature of the light source C,
wherein the reflecting layer reflects ambient light, which passed through the liquid crystal panel and the light guide in sequence, in such a way that the ambient light reflected by the reflecting layer passes through the light guide and illuminates the liquid crystal panel, and
wherein spectral characteristics of the red color filter, the green color filter and the blue color filter are configured such that the color temperature of composite light is higher than the color temperature of the light source C, said composite light being defined as light combining:
(i) light that emerges from the red color filter when light of the light source C is let to pass and return through the red color filter,
(ii) light that emerges from the green color filter when light of the light source C is let to pass and return through the green color filter, and
(iii) light that emerges from the blue color filter when light of the light source C is let to pass and return through the blue color filter.

5. The LCD apparatus according to claim 4, wherein the backlight further comprises a light-emitting device which emits light toward an edge of the light guide, and
wherein the light-emitting device emits light in such a way that the color temperature of composite light, which composite light is defined as light combining (i) light that originated from the light-emitting device, went through the backlight, and passed once through a color filter, constituting a red component, (ii) light that originated from the light-emitting device, went through the backlight, and passed once through a color filter, constituting a green component, and (iii) light that originated from the light-emitting device, went through the backlight, and passed once through a color filter, constituting a blue component, is substantially equal to the color temperature of the light source C.

6. An LCD apparatus, comprising:
a liquid crystal panel including display pixels in which a red color filter, a green color filter and a blue color filter are disposed; and
a side lighting type backlight including a reflecting layer and a light guide disposed between the reflecting layer and the liquid crystal panel, the light guide having such characteristic that white light, which originates from a predetermined light source and passed and returned through the light guide, is changed in color tone into predetermined color,
wherein the reflecting layer reflects ambient light, which passed through the liquid crystal panel and the light guide in sequence, in such a way that the ambient light reflected by the reflecting layer passes through the light guide and illuminates the liquid crystal panel, and
wherein spectral characteristics of the red color filter, the green color filter, and the blue color filter are configured such that the color tone of composite light substantially compensates for the change in the color tone of said white light into the predetermined color caused by the light guide, said composite light being defined as light combining:

(i) light that emerges from the red color filter when said white light is let to pass and return through the red color filter,
(ii) light that emerges from the green color filter when said white light is let to pass and return through the green color filter, and
(iii) light that emerges from the blue color filter when said white light is let to pass and return through the blue color filter.

7. The LCD apparatus according to claim 6, wherein the backlight further comprises a light-emitting device which emits light toward an edge of the light guide, and wherein the light-emitting device emits light having color tone of the predetermined color.

* * * * *